United States Patent
Oda et al.

[19]

[11] Patent Number: 5,937,821
[45] Date of Patent: *Aug. 17, 1999

[54] CONTROL APPARATUS FOR AN IN-CYLINDER INJECTION TYPE INTERNAL COMBUSTION ENGINE

[75] Inventors: Hideyuki Oda, Nagoya; Kenji Goto; Masayuki Miyamoto, both of Kyoto, all of Japan

[73] Assignee: Mitsubishi Jidosha Kogyo Kabushiki Kaisha, Tokyo, Japan

[*] Notice: This patent is subject to a terminal disclaimer.

[21] Appl. No.: 08/990,144

[22] Filed: Dec. 12, 1997

[30] Foreign Application Priority Data

Dec. 13, 1996 [JP] Japan ..................................... 8-334156

[51] Int. Cl.$^6$ ...................................................... F02B 17/00
[52] U.S. Cl. ...................................... 123/295; 123/184.55
[58] Field of Search .......................... 123/184.55, 184.56, 123/295, 302

[56] References Cited

U.S. PATENT DOCUMENTS

| | | | |
|---|---|---|---|
| 4,932,369 | 6/1990 | Parr | 123/184.55 |
| 5,438,964 | 8/1995 | Breidenbach | 123/184.55 |
| 5,709,190 | 1/1998 | Suzuki | 123/302 |
| 5,709,191 | 1/1998 | Monnier | 123/302 |

FOREIGN PATENT DOCUMENTS

| | | | |
|---|---|---|---|
| 62-255529 | 11/1987 | Japan | 123/295 |
| 3-281915 | 12/1991 | Japan | 123/295 |
| 5-113146 | 5/1993 | Japan . | |

*Primary Examiner*—Erick R. Solis

[57] ABSTRACT

A control apparatus for an in-cylinder injection type internal combustion engine includes an electronic control unit and an induction control system for changing the flow of air in the induction system of the engine. The electronic control unit selects one of fuel injection modes including a compression-stroke injection mode and an intake-stroke injection mode in accordance with the engine operating state. When the engine is operated in the compression-stroke injection mode, the electronic control unit controls the induction control system so as to enhance a stratified degree of an intake air flow generated in the combustion chamber of the engine, to thereby stabilize a combustion, especially, in the compression-stroke injection mode, whereby the fuel efficiency and the engine output are improved.

3 Claims, 4 Drawing Sheets

5,937,821

CONTROL APPARATUS FOR AN IN-CYLINDER INJECTION TYPE INTERNAL COMBUSTION ENGINE

BACKGROUND OF THE INVENTION

1. Technical Field of the Invention

The present invention relates to an in-cylinder injection type internal combustion engine, and more particularly, to a control apparatus for an engine of this type which apparatus makes a stratified degree of the intake air flow generated in a combustion chamber suitable for a fuel injection mode, to thereby improve the fuel consumption and output of the engine.

2. Description of the Related Art

A spark-ignition type multi-cylinder internal combustion engine is provided with an induction system comprising an intake pipe in which a throttle valve is disposed and an intake manifold through which the intake air supplied from the intake pipe is distributed to respective cylinders of the engine. The vertical motions of pistons in the cylinders and the opening/closing actions of intake valves cause the air pressure in the induction system to periodically vary.

If a positive pressure wave caused by the pressure pulsation reaches an intake valve which is open, the introduction of intake air into a cylinder through the intake valve is promoted. Thus, the pulsating intake air produces a supercharging effect. If a negative pressure wave, generated when the intake valve for a given cylinder was opened, reaches the intake valve of a different cylinder, the introduction of intake air into the latter cylinder is suppressed. That is, the induction interference between cylinders takes place. Moreover, the intake air acquires inertia while being transferred to a cylinder. The inertial induction produces a supercharging effect. The inertia of intake air increases with the increase in engine speed and in intake pipe length.

In view of the above, the induction system is designed to improve the induction efficiency. In order to reduce the induction interference, a surge tank is provided between the intake pipe and the intake manifold. The induction system is configured to attain the supercharging effect of inertial induction and pulsating induction. However, an optimum length of the intake pipe for attainment of the supercharging effect varies depending on engine speed, whereas the intake pipe usually has a fixed length. Thus, it is difficult to attain the supercharging effect over the entire engine speed region.

In this regard, various induction control systems for changing the intake pipe length depending on the engine operating state have been proposed. For example, an induction control system is known which changes the effective length of the intake manifold in two stages, by opening and closing an induction control valve to cause the effective-length increasing function of a detour induction passage, interposed between upstream portion and downstream portion of the intake manifold, to be selectively effective. This system closes the induction control valve to cause the intake air to flow from the upstream portion into the downstream portion of the intake manifold by way of the detour induction passage when the engine is in a low-speed region, and opens the valve to cause the air to bypass the detour passage so that the air flows directly into the downstream portion of the intake manifold. By changing the effective pipe length depending on the engine speed in this manner, the induction efficiency can be improved over the entire engine speed region.

For spark-ignition type internal combustion engines, various in-cylinder injection type gasoline engines have been proposed which directly inject fuel into a combustion chamber, unlike conventional intake-manifold injection type engines. A typical in-cylinder injection type engine is arranged to inject fuel from a fuel injection valve into a cavity formed in the top of a piston of the engine when the engine is in a low-load region, to thereby form a substantially stoichiometric air-fuel mixture around an ignition plug at ignition timing and form a lean mixture around the substantially stoichiometric mixture. If such a stratified charging is achieved by performing the fuel injection In the compression-stroke injection mode (second-term injection mode), a lean air-fuel mixture whose air-fuel ratio is lean when observed over the entire of the cylinder is enabled to be burnt, the emission of harmful exhaust-gas components is reduced, and the fuel consumption is greatly improved. When the engine is in a medium- or high-load region, fuel is injected In the intake stroke to form a stoichiometric or rich mixture uniformly in the cylinder, thereby obtaining a desired engine output while preventing an overrich misfire.

In order to stabilize the stratified charging for stable stratified combustion in the compression-stroke injection mode, some technical idea must be put into in designing the engine. For example, a technique of generating a circling flow (e.g., a so-called tumble flow or swirl flow) of intake air in a cavity formed in the top of a piston is proposed, whereby a substantially stoichiometric air-fuel mixture is retained In the cavity under the action of the circling flow of intake air.

SUMMARY OF THE INVENTION

In order to further improve the fuel consumption and output of an in-cylinder injection type Internal combustion engine, the present Inventors attempted to utilize an induction control system. According to experiments, it was found that a stabilized combustion could not be achieved depending on a combination of fuel injection mode of the engine and an operating mode (effective intake pipe length) of the induction control system. For instance, in the case of using an induction control system provided with a detour Induction passage which has a considerable length for the passage length adjustment and a complicated shape for avoiding interference with peripheral components, a stable combustion could not be attained, if the effective pipe length was made long at the time of engine operation in the compression-stroke injection mode. In the case of using a different type of induction control system which selects either a first induction passage which is long in length but small in change in the cross-sectional shape and a second induction passage which is short in length but large in change in the sectional shape, a stable combustion could not be attained if the effective pipe length made short by selecting the second passage.

According to the knowledge of the present inventors, in order to obtain a stable combustion when the engine is operated in the compression-stroke injection mode, a strong circling flow of intake air must be generated to enhance a stratified degree of intake air flow, thereby increasing the degree of stratified charging. It is considered that the reason why the combustion cannot be stabilized resides in that the circling flow strong enough to attain a desired stratified degree of intake air flow cannot be generated. The strength of circling flow is represented, e.g., by a circling flow ratio (which is a ratio of the rotational speed of circling flow to the engine rotational speed). The strength of circling flow becomes greater as the circling flow ratio increases. Meanwhile, in the intake-stroke injection mode (first-term injection mode) selected when the engine is operated in a medium- or heavy load region, the circling flow enhances the uniformity of air-fuel mixture in the cylinder, but the strength of the circling flow does not greatly affect the stability of combustion.

An object of the present invention is to provide a control apparatus for an in-cylinder injection type internal combustion engine, which apparatus can make the stratified degree of intake air flow suitable for the fuel injection mode, thereby improving the fuel consumption and output of the engine.

According to the present invention, there is provided a control apparatus of an in-cylinder injection type internal combustion engine which is selectively operated in at least either a compression-stroke injection mode where fuel is injected in a compression stroke or an intake-stroke injection mode where the fuel is injected in an intake stroke of the engine.

The control apparatus of this invention comprises an air flow changing system for introducing air into a combustion chamber of the engine and for changing a flow of the air, and stratified-degree changing means for operating the air flow changing system in accordance with the selected injection mode, to thereby change a stratified degree of an intake air flow which is generated by the air introduced into the combustion chamber. In the compression-stroke injection mode, the stratified-degree changing means operates the air flow changing system so as to enhance the stratified degree of the intake air flow.

The present invention is advantageous in that the stratified degree of the intake air flow is made suitable for the fuel injection mode (engine operating state), to thereby attain a stable combustion in an in-cylinder injection type internal combustion engine, whereby the fuel consumption and output of the engine can be improved. Especially, the present invention makes it possible to change the flow of air in the induction system so as to enhance the stratified degree of the intake air flow when the engine is operated in the compression-stroke injection mode in which a combustion is liable to be affected by the stratified degree of the intake air flow. As a consequence, the stratified charging can be stabilized for stable stratified combustion.

In the present invention, preferably, the air flow changing system has an induction passage through which the air flows, and operates to change an effective length of the induction passage. More preferably, when the internal combustion engine is operated in the compression-stroke injection mode, the stratified-degree changing means causes the air flow changing system to operate to shorten or lengthen the effective length of the induction passage, thereby enhancing the stratified degree of the intake air flow.

With these preferred arrangements, the induction passage length can be changed to an optimum length suitable for the injection mode, to thereby attain a desired stratified degree of the intake air flow suited to the injection mode. Especially, in the case of using an air flow changing system designed to permit the air to smoothly flow therethrough when the length of the induction passage defined therein is made long, the induction passage length can be lengthened when the engine is operated in the compression-stroke injection mode. Conversely, the induction passage length can be shortened in case that an air flow changing system is employed which is designed to establish a smooth air flow in a condition that the induction passage is short in length. In either case, the stratified degree of the intake air flow in the compression-stroke injection mode is enhanced, to thereby attain a stable combustion and an improved fuel efficiency. Additionally, in the case of making the length of the induction passage long in the compression-stroke injection mode, the volumetric efficiency can be improved in the compression-stroke injection mode, whereby the engine output and combustion stability can be further enhanced.

DETAILED DESCRIPTION

A spark-ignition, in-cylinder injection type internal combustion engine (hereinafter referred to as engine) on which a control apparatus according to a first embodiment of this invention is mounted will be explained.

Figure 1:
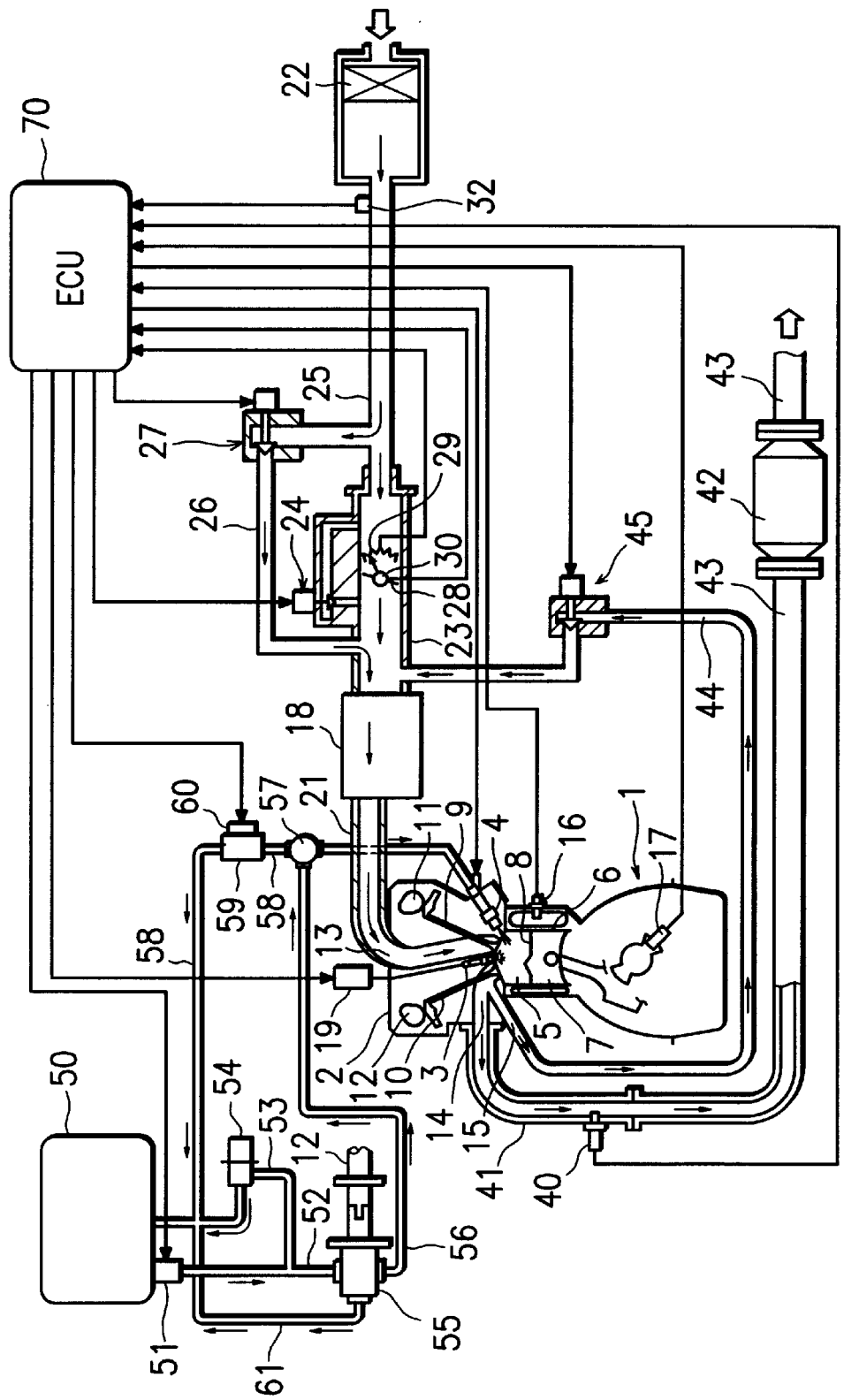
FIG. 1 is a schematic view of an in-cylinder injection type internal combustion engine equipped with a control apparatus according to a first embodiment of the present invention.

Referring to FIG. 1, the engine 1 has a cylinder head 2 thereof fitted with a spark plug 3 and an electromagnetic fuel injection valve 4 for each cylinder, so that fuel may be injected from the fuel injection valve 4 directly into a combustion chamber 5 concerned. A hemispherical cavity 8 is formed in the top surface of a piston 7 disposed in the cylinder 6 for reciprocal motion. The cavity is located at a position to which fuel spray can reach if the fuel is injected from the fuel injection valve 4 at timing in a latter stage of the compression stroke of the engine. The theoretical compression ratio of the engine 1 is set to a value (in this embodiment, approximately 12) higher than that of an intake-manifold injection type engine. A DOHC four-valve system is employed as a valve driving mechanism. Intake-side and exhaust-side camshafts 11 and 12 for driving intake and exhaust valves 9 and 10 are rotatably held at an upper portion of the cylinder head 2.

The cylinder head 2 is formed with intake ports 13 which extend substantially upright between the camshafts 11 and 12. Intake air flow having passed through the intake port 13 can generate a tumble flow in the combustion chamber 5. Exhaust ports 14 extend substantially in the horizontal direction, as in the case of those of ordinary engines. A large-diameter EGR port 15 diverges diagonally downward from the exhaust port concerned. The engine 1 is provided with a water temperature sensor 16 for detecting a cooling water temperature Tw, a crank angle sensor 17 for outputting a crank angle signal SGT at predetermined crank positions for each cylinder and for detecting the engine rotational speed Ne based on the crank angle signal SGT. Further, an ignition coil 19 for supplying a high voltage to the spark plug 3 is provided. One of the camshafts, which rotate at half the speed of the crankshaft, is fitted with a cylinder discriminating sensor (not shown) for outputting a cylinder discriminating signal SGC, whereby the cylinder for which the crank angle signal SGT is output is discriminated based on the sensor signal SGC.

The intake ports 13 are connected, through an intake manifold 21, with an intake pipe 25 which is provided with a throttle body 23, a first air bypass valve (#1ABV) 24 of a stepper-motor type serving as intake-air amount correction means, and an air cleaner 22. The intake pipe 25 is further provided with a large-diameter air bypass pipe 26 through which intake air is introduced, bypassing the throttle body 23, to the intake manifold 21 and in which a second air bypass valve (#2ABV) 27 of a large linear-solenoid type is disposed. The air bypass pipe 26 has a flow area substantially equal to that of the intake pipe 25, so that a quantity of intake air, required for engine operation in a low or medium speed region, can flow through the pipe 26 when the second air bypass valve 27 is fully open. The first air bypass valve 24 has a flow area smaller than that of the second air bypass valve 27 and is used to finely adjust the intake air amount.

The throttle body 23 is provided with a butterfly type throttle valve 28 for opening and closing the intake passage formed therein, a throttle position sensor 29 for detecting the throttle opening degree θth, and an idle switch 30 for detecting a fully-closed state of the throttle valve 28, i.e., an idle state of the engine. An intake air temperature sensor and an atmospheric pressure sensor (none of which is shown), for determining the density of intake air are disposed in the air cleaner 22. These sensors deliver output signals indicative of the atmospheric pressure and the intake air temperature, respectively. In the vicinity of the inlet of the intake pipe 25, a Karman's vortex type air flow sensor 32 is disposed and outputs a vortex occurrence signal which is proportional to the volumetric air flow rate Qa per intake stroke. Instead of the air flow sensor 32, a boost pressure sensor, not shown, for detecting the intake air pressure within the intake pipe 25 may be provided.

The engine 1 is provided with a control apparatus which operates to make a stratified degree of intake air flow, generated by air introduced into the combustion chamber, suitable for the fuel injection mode. The control apparatus includes an air flow changing system for changing the flow of the air in the induction system of the engine 1, and stratified degree changing means for operating the air flow changing system in accordance with the injection mode to thereby change the stratified degree of the intake air flow. In this embodiment, the stratified degree changing means is constituted by the below-mentioned electronic control unit (ECU) 70, and the air flow changing system is constituted by an induction control system 18 which is of an effective pipe length changing type.

Figure 2:
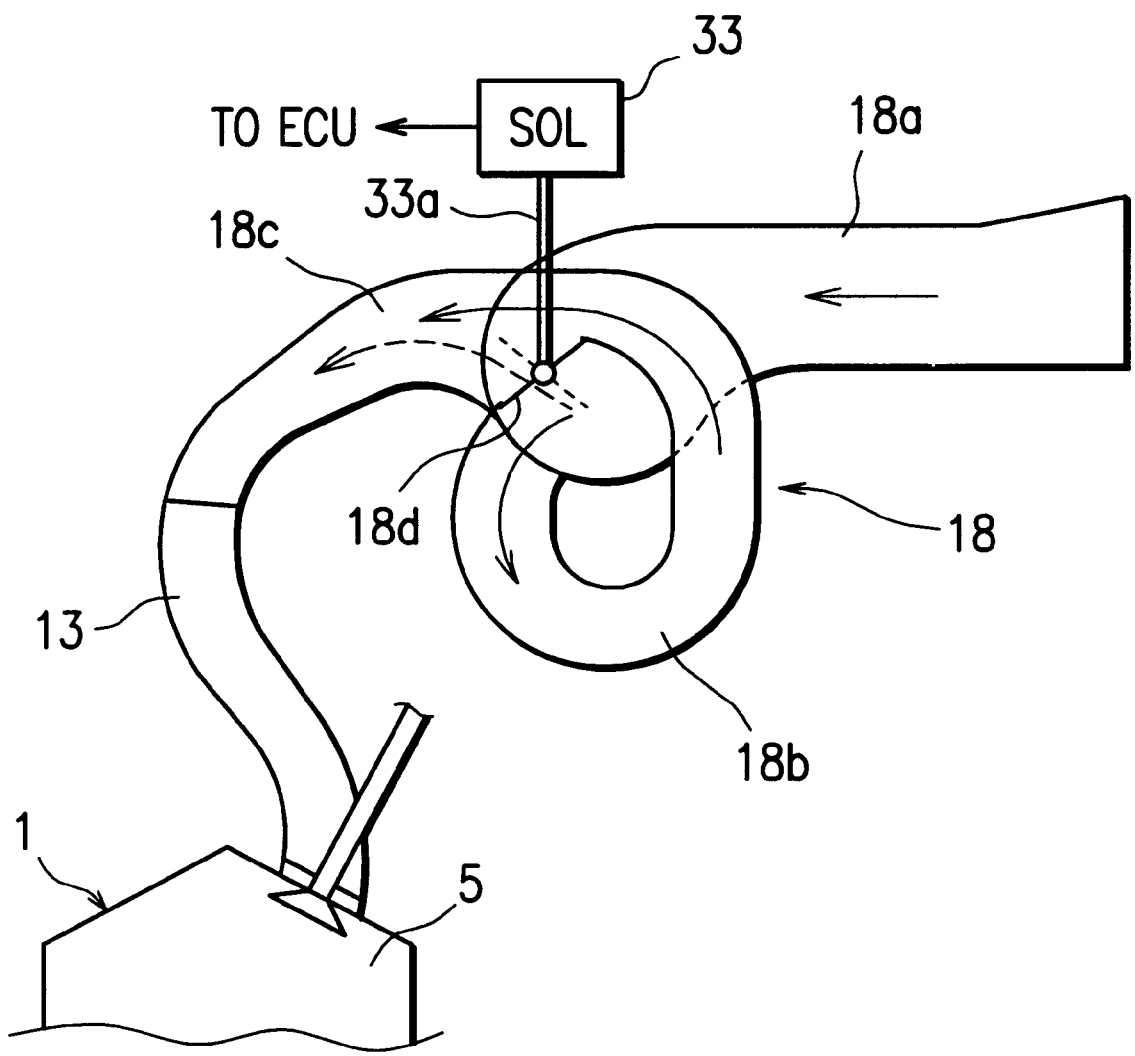
FIG. 2 is a schematic view showing an induction control system for use as an air flow changing system in the control apparatus of the first embodiment.

Referring to FIG. 2, the induction control system 18 includes a first induction pipe 18a which constitutes a downstream portion of the intake pipe 25. A downstream end portion of the first pipe 18a constitutes a surge tank. The first pipe 18a has a downstream end thereof connected with upstream ends of second induction pipes (detour pipes). One of the second pipes is denoted by reference numeral 18b. Sections where the pipes 18a and 18b are connected with each other are referred to as first communicating sections. At second communicating sections located adjacent to the first communicating sections, the downstream end of the first pipe 18a is connected with upstream ends of third induction pipes which cooperate with the second pipes 18b to constitute the intake manifold 21 whose effective length is variable. One of the third pipes is shown by reference numeral 18c. Induction control valves (one of which is shown by reference numeral 18d) for selectively permitting or prohibiting the communication between the first pipe 18a and the third pipes 18c are disposed at the second communication sections. At third communicating sections adjacent to the second communicating sections, the downstream ends of the second pipes 18b are connected to the upstream ends of the third pipes 18c whose downstream ends are connected to the upstream ends of the intake ports 13 for the respective cylinders of the engine 1.

The pipes 18a, 18b and 18c of the induction control system. 18 are disposed so as not to interfere with various components disposed in the engine room of a vehicle on which the engine 1 is installed and with the bonnet hood of the vehicle. In addition to such a general requirement, the second pipes 18b must satisfy additional requirements such that they must be formed into a shape which permits their upstream and downstream ends to be connected with the downstream ends of the third pipes 18c and their lengths are long enough to exhibit the function of increasing the effective length of the intake manifold 21. As a consequence, each of the second pipes 18b has a considerable length, has a bent or curved shape as viewed in the lengthwise direction of the pipe 18b, and has a cross section which varies in shape at different lengthwise positions of the pipe 18b. Thus, the air receives a large resistance when it flows through the pipe 18b.

Especially, in a V-type engine having a so-called vertical intake port, there is a limited space between the upper portion of the engine and the bonnet hood, so that the induction control system is disposed between the right and left cylinder banks of the engine. In this case, the second pipe 18b must be formed into a further complicated shape where the cross-sectional area of the pipe greatly varies along its lengthwise direction. Meanwhile, the first and third pipes 18a and 18c are less likely to be bent and are hence small in change in its cross-sectional shape.

The induction control valve 18d, disposed at the second communicating section where the pipes 18a and 18c are connected with each other, is coupled to a movable rod 33a of a solenoid 33 through a coupling member such as a lever, not shown. The solenoid 33 includes an excitation coil electrically connected with the output side of an electric control unit (ECU) 70. The induction control valve 18d takes an ON position (shown by broken line in FIG. 2) where it permits the communication between the pipes 18a and 18c to be established when the excitation coil of the solenoid 33 is energized, and takes an OFF position (shown by solid line in FIG. 2) where it prohibits the communication therebetween when the excitation coil is de-energized, for instance.

When the induction control valve 18d is in the OFF position, the first pipe 18a is connected through the second pipe 18b with the third pipe 18c, so that the length of the intake manifold 21 (more generally, the length of the intake passage of the induction system) becomes long. The air supplied from the intake pipe 25 flows along the induction route constituted by the pipes 18a, 18b and 18c, as shown by solid arrow in FIG. 2. At this time, the flow of the air passing through the induction passage of the induction control system 18 is unsmoothed by a degree corresponding to the induction resistance of the second pipe 18b, so that the strength of the tumble air flow formed in the combustion chamber 5 is weakened. On the other hand, when the induction control valve 18d is at the ON position, the second pipe 18b is short-circuited, so that the first pipe 18a is connected directly with the third pipe 18c. As a consequence, the length of the intake manifold 21 is shortened, and a bend in the resultant induction passage defined in the intake manifold 21 is relatively lessened and hence a change in the cross-sectional area of this passage is relatively small. The intake air flows along the route comprised of the first and third pipes 18a and 18c, as shown by broken arrow in FIG. 2. The air flow passing through the induction passage defined at this time in the induction control system 18 is smoothed by a degree corresponding to the eliminated induction resistance of the second pipe 18b, so that the resultant tumble flow is strengthened.

The Exhaust ports 14 are connected, through an exhaust manifold 41 provided with an $O_2$ sensor 40, to an exhaust pipe 43 which is provided with a three way catalyst 42, a muffler (not shown) and the like. The aforementioned EGR ports 15 are connected to the downstream of the throttle valve 28 and the upstream of the intake manifold 21 through a large-diameter EGR pipe 44 in which a stepper-motor type EGR valve 45 is provided.

The fuel stored in a fuel tank 50 is sucked up by a motor-operated low-pressure fuel pump 51, and is supplied to the engine 1 through a low-pressure feed pipe 52. The pressure of the fuel in the low-pressure feed pipe 52 is adjusted to a relatively low pressure by a first fuel pressure regulator 54 interposed in the line of a return pipe 53. The fuel supplied toward the engine 1 is fed into each fuel injection valve 4 through a high-pressure feed pipe 56 and a delivery pipe 57 by means of a high-pressure fuel pump 55 attached to the cylinder head 2. The fuel pump 55 is driven by the camshaft 11 or 12 to generate a discharge pressure equal to or greater than 5 Ma to 7 Ma even when the engine 1 runs idle. The fuel pressure in the delivery pipe 57 is adjusted to a relatively high pressure by a second fuel pressure regulator 59 interposed in the line of a return pipe 58. A fuel pressure selector valve 60, attached to the second fuel pressure regulator 59, operates at its ON position to relieve the fuel, thereby lowering the fuel pressure in the delivery pipe 57. Part of fuel used to lubricate and cool the high-pressure fuel pump 55 is returned to the fuel tank 50 through a return pipe 61.

An electronic control unit (ECU) 70 provided in a passenger cabin of the vehicle includes an I/O unit, storage units (ROM, RAM, BURAM, etc.) used to store control program, control map and the like, central processing unit (CPU), timer counter, and the like. The ECU 70 conducts an overall control of the engine 1.

Various switches (not shown) for detecting the operating states of an air conditioner, power steering device, automatic transmission and the like which apply loads to the engine 1 when operated are connected to the input side of the ECU 70 which receives detection signals from these switches. In addition to the above-mentioned various sensors and switches, many switches and sensors (not shown) are connected to the input side of the ECU 70 the output side of which is connected to warning lights, pieces of equipment and the like.

In accordance with input signals supplied from the sensors and switches concerned, the ECU 70 determines fuel injection mode, fuel injection amount, fuel-injection termination timing, ignition timing, EGR gas introduction amount and the like, and then controls the fuel injection valves 4, the ignition coil 19, the EGR valve 45 and the like.

In the following, a brief explanation will be given as to an ordinary control of the engine 1.

When the driver turns the ignition key switch to an ON position, the ECU 70 turns the low-pressure fuel pump 51 and the fuel pressure switching valve 60 on, thereby supplying the fuel injection valves 4 with the fuel at low pressure since the high-pressure fuel pump 55 insufficiently operates at the time of cranking the engine 1.

When the driver turns the ignition key switch to a START position, the engine 1 is cranked by a self-starter, not shown, and at the same time the ECU 70 starts a fuel injection control. At this time, the ECU 70 selects the intake-stroke injection mode (first-term injection mode), and controls fuel injection to attain a relatively rich air-fuel ratio. The reason for doing this is that a fuel injection amount must be increased to ensure a sufficient amount of fuel which contributes to combustion since the rate of vaporization of fuel is low when the engine is in a cold state. Further, the ECU 70 closes the second air bypass valve 27 at the start of the engine, so that intake air is supplied into the combustion chamber 5 through the clearance between the throttle valve 28 and the peripheral wall of the intake pipe 25 and through the bypass passage where the first air bypass valve 24 is disposed.

When the engine 1 starts an idle operation after the engine starting is completed, the high-pressure fuel pump 55 initiates a rated discharge operation. In response to this, the ECU 70 turns off the fuel pressure selector valve 60, and supplies the fuel at high fuel pressure to the fuel injection valves 4. Until the engine cooling water temperature Tw is raised to a predetermined value, the ECU 70 selects the intake-stroke injection mode for fuel injection to secure a rich air-fuel ratio, and closes the second air bypass valve 27, just as at the time of the engine starting. The idle speed control that is based on the variation of the loads of auxiliary apparatuses, such as an air conditioner, is carried out by means of the first air bypass valve 24, as in the case of the manifold-injection type engine. When the activation of the $O_2$ sensor 40 is completed, the ECU 70 starts air-fuel ratio feedback control in accordance with the output voltage of the $O_2$ sensor 40, and the three-way catalyst 42 is permitted to remove harmful exhaust gas components. As described in the above, when the engine is cold, fuel injection control is effected substantially in the same manner as in the case of the manifold-injection engine. Control response and control accuracy are improved in the in-cylinder injection engine which is free from adherence of fuel drop to the wall of the intake manifold 21.

Figure 3:
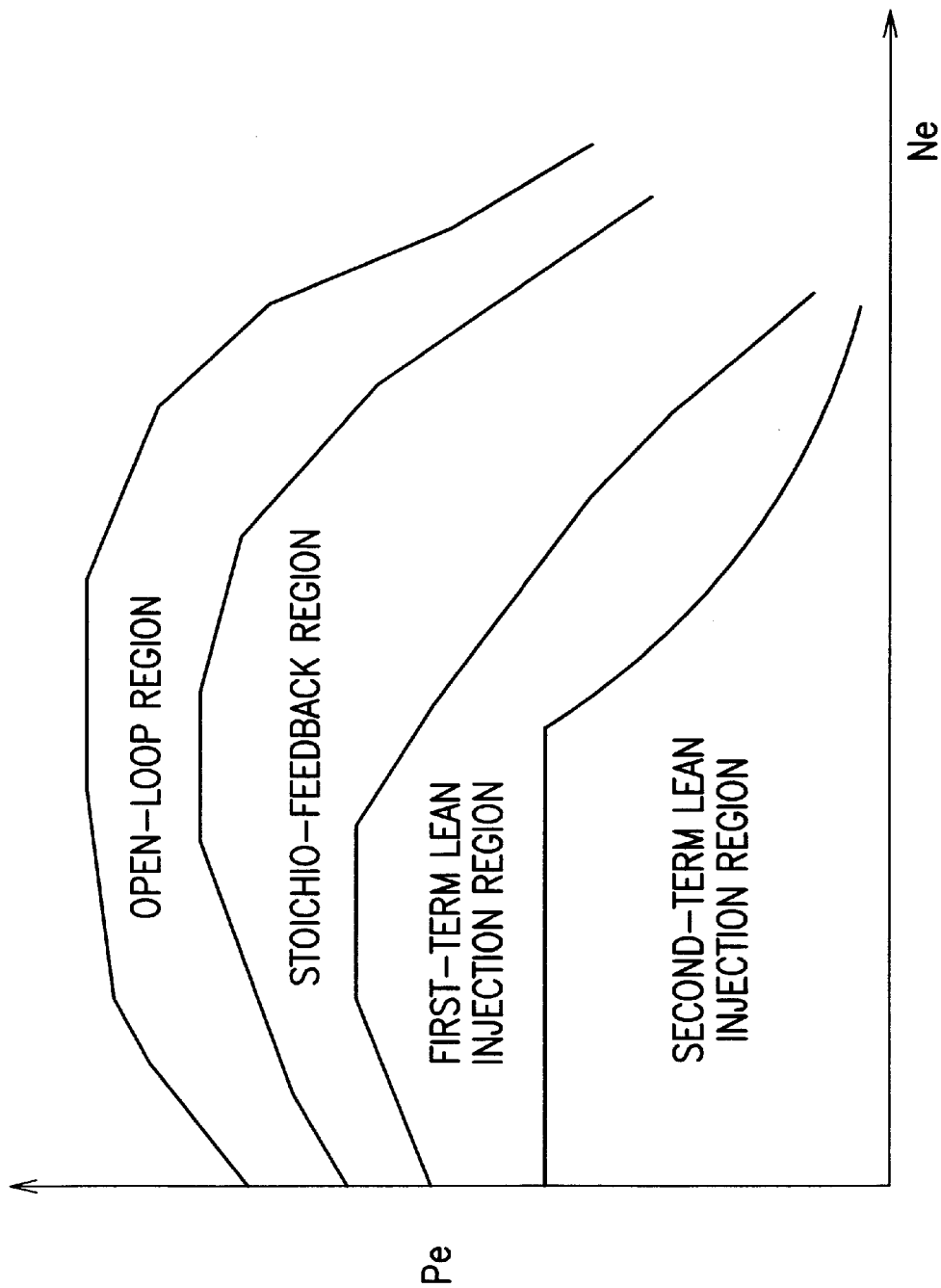
FIG. 3 is a map with which a fuel injection control of the engine shown in FIG. 1 is carried out.

When warming up the engine 1 is finished, the ECU 70 retrieves a present fuel injection control region from a fuel injection control map shown in FIG. 3 in accordance with the engine speed Ne and a target average effective pressure Pe which is obtained from the intake air amount Qa or throttle opening θth, etc. Then, the ECU 70 determines the fuel injection mode, fuel injection quantity, and fuel injection timing, and drives the fuel injection valves 4. Further, the ECU 70 controls the open-close operation of the first and second air bypass valves 24 and 27 and the EGR valves 45.

In a low-load, low-speed operating region for idle operation, etc., the engine is operated in a compression-stroke lean injection region (the second-term injection region), as shown in the map of FIG. 3, so that the ECU 70 selects a compression-stroke injection mode (second-term injection mode). The second air bypass valve 27 and the EGR valve 45 are opened, and the fuel is injected so as to obtain a lean average air-fuel ratio (e.g., about 30 to 40).

The intake air introduced into the combustion chamber through the intake port 13 generates a tumble flow, so that a fuel spray is kept in the cavity 8 of the piston 7 under the action of the tumble flow. As a result, an air-fuel mixture of an air-fuel ratio near the stoichiometric air-fuel ratio is formed in a layer around the spark plug 3 at the time of ignition, so that the fuel can catch fire even with a lean overall air-fuel ratio, whereby the emission of CO and HC can be reduced. The fuel consumption is largely improved in cooperation with the reduction of pumping loss. The idle speed control responsive to variations in the engine load caused by operations of the auxiliary apparatuses is carried out by increasing or decreasing the fuel injection quantity, so that control response is also very high. In this control region, the ECU 70 opens the EGR valve 45 to introduce a large amount (e.g., 30% or more) of EGR gas into the combustion chamber 5, thereby greatly reducing the emission of NOx.

In a medium-load region for constant-speed drive or the like, the engine is operated in an intake-stroke lean injection region (first-term injection region), a stoichiometric air-fuel ratio feedback region (stoichio-feedback region) or open-loop region shown in FIG. 3, depending on the engine load state and the engine speed Ne, so that the ECU 70 selects an intake-stroke injection mode (first-term injection mode), and injects the fuel so as to obtain a predetermined air-fuel ratio suitable for the respective region. More specifically, the respective opening degrees of the first and second air bypass valves 24 and 27 and the fuel injection quantity are controlled so as to obtain a relatively lean air-fuel ratio (e.g., about 20 to 23) in the intake-stroke lean injection region, with the EGR valve 45 kept closed. In the stoichio-feedback region, the air-fuel ratio feedback control is carried out in accordance with the output voltage of the $O_2$ sensor 40, with the opening degrees of the second air bypass valve 27 and the EGR valve 45 controlled by the ECU 70.

In the intake-stroke lean region, the fuel can be ignited even with a lean air-fuel ratio, due to the effect of a turbulence attributable to the tumble flow that is formed by the intake air flow introduced through the intake port 13. In the stoichio-feedback region, harmful exhaust-gas components are removed by the three-way catalyst 42. By controlling the EGR valve 45 so as to introduce a suitable amount of EGR gas into the combustion chamber 5, the emission of NOx can be reduced.

In a high-load region for sudden acceleration or high-speed drive, an open-loop region shown in FIG. 3 is reached, so that the ECU 70 selects the intake-stroke injection mode (enrich mode), closes the second air bypass valve 27, and injects the fuel so as to obtain a relatively rich air-fuel ratio (which is fuel-richer than the stoichiometric air-fuel ratio) in accordance with the intake air amount Qa or throttle opening θth, engine speed Ne, etc. Since a fuel-cut region shown in FIG. 3 is reached when the vehicle is coasting in a medium- or high-speed drive, the ECU 70 stops the fuel injection, whereby the fuel consumption is improved and the emission of harmful exhaust-gas components is reduced. Fuel-cut operation is terminated immediately when the engine speed Ne falls below a restoration speed for restarting the fuel supply or when the accelerator pedal is depressed.

With reference to FIG. 2, a control of the effective length of the intake manifold 21 will be explained which control is performed by the induction control system 18 and the ECU 70 (stratified degree changing means) in order to control the stratified degree of intake air flow.

In the induction control system 18 shown in FIG. 2, a low-speed induction port having a long effective length and adaptable for low engine speed is constituted by the induction passages 18a, 18b and 18c when the induction control valve 18d is open, whereas a high-speed induction having a short effective length and adaptable for high engine speed is constituted by the induction passages 18a and 18c. The low-speed induction port is longer in length and is larger in change in the cross-sectional shape due to the presence of the induction passage 18b as compared to those of the high-speed induction port. The low-speed induction port weakens the strength (the stratified degree of intake air flow) of tumble flow generated by the intake air supplied to the combustion chamber 5 through this port, whereas the high-speed induction port strengthens the tumble flow of intake air supplied therethrough. In this manner, the tumble flow of intake air has its strength which varies depending on the effective length of the intake manifold 21 (the induction passage defined in the induction control system 18). The strength of the tumble flow affects a combustion state in the in-cylinder injection engine. Especially, the stratified degree of intake air flow must be enhanced in the compression-stroke injection mode where an unstable combustion is liable to occur if the tumble flow is weakened or if the stratified degree of intake air flow decreases.

In the present embodiment, the induction control valve 18d is open/close-controlled by the ECU 70 in accordance with the fuel injection mode selected based on the map shown in FIG. 3, to make the effective length of the induction passage adaptable for the selected fuel injection mode, to thereby attain the tumble flow having a desired strength (intake air flow having a desired stratified degree) suitable for the fuel injection mode. As mentioned later, in the enrich injection mode, the induction control valve is controlled in a different manner between when the engine is in a low-speed zone and when it is in a high-speed zone of the open-loop region.

More specifically, the open/close control of the induction control valve 18 in the respective fuel injection modes is carried out as follows:

When the engine 1 is in in a low engine-speed zone of the open-loop region (a low-speed and high-load operating region), i.e., when the engine is operated in the intake-stroke enrich-injection mode, the induction control valve 18d is caused to close, thereby increasing the effective length of the intake manifold 21 (the induction passage defined in the induction control system 18) to constitute the induction port adaptable for low engine speed. As a result, the supercharging effect of inertial induction is enhanced to improve the induction efficiency, resulting in an increased engine output torque.

When the engine 1 is operated in operating regions other than the low engine-speed zone of the open-loop region, the induction control valve 18d is caused to be open, thereby decreasing the effective length of the intake manifold 21 to constitute the induction port adaptable for high engine speed. As a consequence, the engine 1 and the induction control system 18 functions as follows:

At the time of engine operation in the compression-stroke injection mode, the induction control valve 18d is caused to open to shorten the effective length of the intake manifold 21. The air supplied from the intake pipe 25 into the shortened intake manifold 21 is smoothly sucked into the combustion chamber 5, thereby generating a strong tumble flow of air in the cavity 8 which is formed at the top of the piston 7. That is, the stratified degree of intake air flow is enhanced. The fuel injected at the timing in a latter stage of compression stroke is positively retained within the cavity 8 under the action of the strong tumble flow. As a result, a considerably rich air-fuel mixture is formed stably around the ignition plug 3 at the ignition timing. This makes it possible to stabilize a combustion of fuel, resulting in reduced emission of harmful exhaust-gas components and improved fuel consumption.

At the time of engine operation in the intake-stroke lean injection mode, the induction control valve 18d is caused to open, and hence an amount of intake air sucked into the combustion chamber 5 increases. As a consequence, the fuel injected into the combustion chamber 5 is permitted to be rapidly burnt, resulting in a stable combustion of uniform lean air-fuel mixture.

At the time of engine operation in the intake-stroke stoichio-injection mode, the induction control valve 18d is caused to open, and hence the combustion speed increases. Thus, the antiknock property is improved. This makes it possible to advance the ignition timing, thereby improving the fuel efficiency.

In case that the engine 1 is in a high-speed side zone of the open-loop region and is hence operated in the intake-stroke enrich injection mode, the induction control valve 18d is caused to be open, whereby the induction efficiency is improved and the engine torque increases.

In the following, a control apparatus according to a second embodiment of the present invention will be explained.

The control apparatus of the present embodiment is featured in that it is provided with two sets of induction passages and it operates to select a desired one set of induction passages suitable for the fuel injection mode, as compared to the first embodiment in which the effective length of the intake manifold is changed in two stages. That is, the present embodiment employs, as an air flow changing system, an induction control system 80 shown in FIG. 4 instead of the system shown in FIG. 2. Both the embodiments have the same arrangement in other respects.

Figure 4:
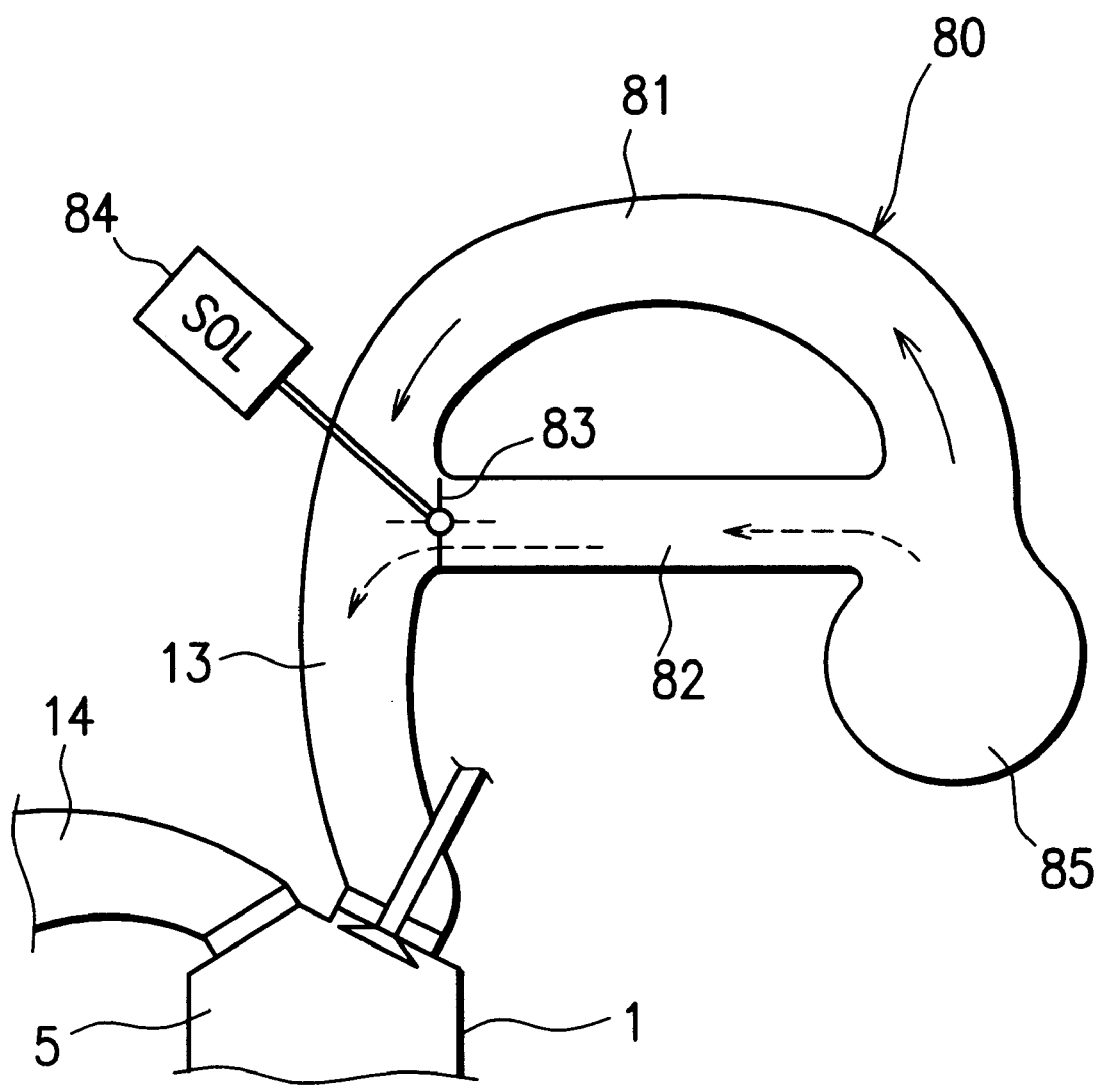
FIG. 4 is a schematic view showing an induction control system which serves as an air flow changing system of a control apparatus according to a second embodiment of the present invention.

Referring to FIG. 4, the induction control system 80 is comprised of first induction pipes (one of which is denoted by reference numeral 81) for low engine speed, which correspond to the respective engine cylinders, and second induction pipes (one of which is shown by reference numeral 82) for high engine speed. The first and second pipes 81 and 82 constitute the intake manifold 21 (FIG. 1) of the engine 1.

The first pipes 81 are connected at their upstream ends with a surge tank 85 in such a manner that the air supplied from the intake pipe 25 (FIG. 1) of the engine 1 to the surge tank 85 smoothly enters the first pipes 81. The first pipes 81 extend, while being smoothly curved, from the surge tank 85 along a circular arc having a large curvature. The first pipes 81 are connected at their downstream ends with the upstream ends of the intake ports 13 in such a manner that the air from the pipes 81 smoothly enters the intake ports 13.

The second pipes 82 are communicated at their upstream ends with the upstream end portions of the first pipes 81, extend from the surge tank 85 along a straight line, and, at their downstream ends, open to the downstream end portions of the first pipes 81. At the upstream and downstream ends, the axes of the second pipes 82 are substantially perpendicular to the axes of the first pipes 81. Thus, the air receives a considerably large resistance both when it enters the second pipe 82 through the upstream open end of the pipe 82 and when it enters the first pipe 81 through the downstream open end of the pipe 82.

The induction control system 80 further includes induction control valves 83 disposed at the downstream open ends of the second pipes 82 and each selectively taking either an open position shown by broken line in FIG. 4 or a closed position shown by solid line in FIG. 4, and solenoids 84 electrically connected with the output side of the ECU (stratified degree changing means) 70 and operable, under the control of the ECU 70, to open and close the induction control valves 83. The ECU 70 drives the solenoids 84 in accordance with the fuel injection mode or the engine operating state, whereby the induction control valves 83 are caused to be open and closed, thereby selecting the first pipes 81 or the second pipes 82.

When the induction control valves 83 are closed so that the communication between the first pipes 81 and the second pipes 82 at the downstream ends of the second pipes 82 is prohibited, the air supplied from the intake pipe 25 to the surge tank 85 flows through the first pipes 81 to the intake ports 13, as shown by solid arrow in FIG. 4. The air flows smoothly through the first pipes 81 which makes the effective length of the induction passage defined in the system 80 long but extend while being smoothly curved. As a result, the formation of a tumble flow in the combustion chamber 5 is not hindered, and hence the stratified degree of intake air flow is enhanced.

On the other hand, when the induction control valves 83 are open, so that the communication between the first and second pipes 81 and 82 at the downstream ends of the second pipes 82 is allowed, the air flows through the first and second pipes 81 and 82 to the intake ports 13. Although the second pipes 82 shorten the effective length of the induction passage defined in the system 80, these pipes 82 are connected at their upstream and downstream ends with the surge tank 85 and the intake ports 13 (actually, connected with the first pipes 81) to form substantially right angles therebetween. Thus, the flow of the air is hindered, especially, at the communicating sections between the pipes 82 and the surge tank 85 and between the pipes 82 and the intake ports 13. Moreover, when the induction control valves 83 are open, their halves project into the first pipes 81, so that the air discharged from the second pipes 82 to the first pipes 81 generate a turbulent air flow and the air flowing from the first pipes 81 to the intake ports also generate a turbulent air flow. As a consequence, the flow of the air flowing through the pipes 81 and 82 to the intake ports 13 are hindered, resulting in a weak tumble flow in the combustion chamber and a degraded stratified degree of intake air flow.

As explained in the above, in the induction control system 80, the selection of only the first pipes 81, which are long in length, makes the air flow smooth as compared with the case where the second pipes 82 which are short in length are also selected, whereby a hindrance to the formation of tumble flow in the combustion chamber 5 can be eliminated.

At least when the engine 1 is operated in the compression-stroke injection mode, therefore, the ECU (stratified degree changing means) 70 drives the solenoids 84 of the induction control system 80 so as to cause the induction control valves 83 to close, whereby the air supply to the intake ports 13 through the first pipes 81 alone is selected. This makes it possible to enhance the formation of the tumble flow, to thereby enhance the stratified degree of the intake air flow in the combustion chamber 5, resulting in a stable combustion. On the other hand, when the engine operates in the fuel injection mode other than, e.g., the compression-stroke injection mode, the induction control valves 83 are closed under the control of the ECU 70, so that the air supply to the intake ports 13 is performed through the first and second pipes 81 and 82.

The present invention is not limited to the first and second embodiments, but may be modified in various manners. For example, an air flow changing system which constitutes part of the control apparatus of this invention may be of any type so long as it can vary the flow of air flowing through the induction system of an engine, thereby changing the stratified degree of the resultant intake air flow in the combustion chamber of the engine.

What is claimed is:

1. A control apparatus of an in-cylinder injection type internal combustion engine which is selectively operated in at least either a compression-stroke injection mode where fuel is injected in a compression stroke or an intake-stroke injection mode where the fuel is injected in an intake stroke of the engine, comprising:

an air flow changing system for introducing air into a combustion chamber of the engine and for changing a flow of the air; and stratified-degree changing means for operating said air flow changing system in accordance with the selected injection mode, to thereby change a stratified degree of an intake air flow which is generated by the air introduced into the combustion chamber, said stratified-degree changing means operating said air flow changing system, in the compression-stroke injection mode, so as to enhance the stratified degree of the intake air flow, wherein said air flow changing system has an induction passage through which the air flows, and operates to chance an effective length of the induction passage.

2. The control apparatus according to claim 1, wherein said stratified-degree changing means causes said air flow changing system to operate to shorten the effective length of the induction passage, thereby enhancing the stratified degree of the intake air flow, when the internal combustion engine is operated in the compression-stroke injection mode.

3. The control apparatus according to claim 1, wherein said stratified-degree changing means causes said air flow changing system to operate to lengthen the effective length of the induction passage, thereby enhancing the stratified degree of the intake air flow, when the internal combustion engine is operated in the compression-stroke injection mode.

* * * * *